US008871857B2

(12) United States Patent
Kimura et al.

(10) Patent No.: US 8,871,857 B2
(45) Date of Patent: Oct. 28, 2014

(54) COATING COMPOSITION

(75) Inventors: Masanori Kimura, Tokyo (JP); Toshio Yamato, Tokyo (JP)

(73) Assignee: Momentive Performance Materials Japan LLC, Tokyo (JP)

( * ) Notice: Subject to any disclaimer, the term of this patent is extended or adjusted under 35 U.S.C. 154(b) by 214 days.

(21) Appl. No.: 13/390,446

(22) PCT Filed: Aug. 4, 2010

(86) PCT No.: PCT/JP2010/004897
§ 371 (c)(1), (2), (4) Date: Mar. 13, 2012

(87) PCT Pub. No.: WO2011/021354
PCT Pub. Date: Feb. 24, 2011

(65) Prior Publication Data
US 2012/0165456 A1   Jun. 28, 2012

(30) Foreign Application Priority Data

Aug. 19, 2009 (JP) ................................. 2009-189727

(51) Int. Cl.
| C08L 83/00 | (2006.01) |
|---|---|
| C08L 83/04 | (2006.01) |
| C09D 5/02 | (2006.01) |
| C09D 151/06 | (2006.01) |
| C09D 123/28 | (2006.01) |
| C08G 77/26 | (2006.01) |
| C09D 7/12 | (2006.01) |
| C08L 23/28 | (2006.01) |
| C08L 75/04 | (2006.01) |

(52) U.S. Cl.
CPC ............... *C08G 77/26* (2013.01); *C09D 5/028* (2013.01); *C09D 151/06* (2013.01); *C09D 123/283* (2013.01); *C09D 5/022* (2013.01); *C09D 7/1291* (2013.01); *C08L 23/283* (2013.01); *C08L 83/04* (2013.01); *C08L 75/04* (2013.01)
USPC .......................................... 524/506; 524/588

(58) Field of Classification Search
USPC ........................................................ 524/506
See application file for complete search history.

(56) References Cited

U.S. PATENT DOCUMENTS

| 5,525,427 A | 6/1996 | Griswold et al. |
|---|---|---|
| 5,760,109 A | 6/1998 | Inokuchi et al. |
| 7,368,174 B2 | 5/2008 | Fonda |
| 7,425,372 B2 | 9/2008 | Yamato et al. |
| 2002/0032274 A1 | 3/2002 | Sato et al. |
| 2003/0088017 A1 | 5/2003 | Sato et al. |
| 2003/0088018 A1 | 5/2003 | Sato et al. |
| 2005/0316653 | 2/2005 | Kwetkat et al. |
| 2006/0167175 A1 * | 7/2006 | Yamato et al. ................ 524/588 |
| 2006/0222870 A1 * | 10/2006 | Inokuchi ....................... 428/447 |
| 2007/0134502 A1 | 6/2007 | Fonda |

FOREIGN PATENT DOCUMENTS

| JP | 06-025604 A | 2/1994 | |
|---|---|---|---|
| JP | 07-109440 A | 4/1995 | |
| JP | 08-225670 A | 9/1996 | |
| JP | 08-245882 A | 9/1996 | |
| JP | 08-319458 A | 12/1996 | |
| JP | 09-053047 A | 2/1997 | |
| JP | 09100332 A * | 4/1997 | ............ C08G 18/08 |
| JP | 2002-030247 A | 1/2002 | |
| JP | 2002-188057 A | 7/2002 | |
| JP | 2005-506896 A | 3/2005 | |
| JP | 2006-312713 A | 11/2006 | |
| JP | 2009-520082 A | 5/2009 | |
| WO | WO 2004/111144 A1 | 12/2004 | |

OTHER PUBLICATIONS

Translation of Abstract of JP 09100332, Apr. 15, 1997.*
Translation of International Preliminary Report on Patentability of PCT/JP2010/004897, dated Mar. 22, 2012, 7 pages.

* cited by examiner

*Primary Examiner* — Hui Chin
(74) *Attorney, Agent, or Firm* — Foley & Lardner LLP

(57) ABSTRACT

A coating composition contains (A) a water-based emulsion containing (a) amino group-containing polyorganosiloxane having a self crosslinking property, (b) chlorinated polyolefin, and (c) a water dispersible polyurethane resin, and (B) spherical particles made up of a rubbery elastic body mixed and dispersed in the water-based emulsion (A). The water-based emulsion (A) can be obtained by mixing a first emulsion containing the amino group-containing polyorganosiloxane (a), a second emulsion containing the chlorinated polyolefin (b), and the water dispersion of the polyurethane resin (c). The coating composition can form a coating film excellent in preservation stability, coating uniformity, working life, having good non-tackness, water repellancy, lubricity, and excellent in adhesiveness and abrasion resistance.

14 Claims, No Drawings

COATING COMPOSITION

TECHNICAL FIELD

The present invention relates to a coating composition, and in particular to a coating composition capable of forming a coating film excellent in adhesiveness with a base material, having non-tackness, good in water repellancy, and lubricity, and excellent in abrasion resistance.

BACKGROUND ART

Conventionally, a coating agent composed of various kinds of polyorganosiloxane compositions have been coated on surfaces of products such as an ethylene-propylene-diene ternary copolymer (hereinafter, it is abbreviated to EPDM) rubber, thermoplastic olefinic elastomer (hereinafter, it is abbreviated to TPO) used for a weather strip for a vehicle to provide non-tackness, water repellacy, abrasion resistance, lubricity, and so on.

For example, a composition in which polyorganosiloxane having a hydrogen atom coupled to a silicon atom and/or organoalkoxysilane and curing catalyst are added to polydiorganosiloxane having a hydroxyl group at an end thereof is known as the coating agent. Besides, a composition in which polydiorganosiloxane is compounded to curing polyurethane is also known (for example, refer to Reference 1, Reference 2).

However, these coating compositions contain an organic solvent, and therefore, there are not only safety, sanitary problems and handling problems resulting from inflammability, but also a problem having a significant impact on a natural environment. Accordingly, a development of a water-based emulsion type coating agent which does not contain the organic solvent has been made. However, a coating film having durability, adhesiveness, and so on cannot be obtained by applying an organic solvent dilution type coating agent to a water-base as it is. Besides, there are problems in which a coating agent containing organoalkoxysilane is difficult to make it water-based because a silane component reacts with an isocyanate component and water, a coating film having good adhesiveness cannot be obtained.

On the other hand, an aqueous silicone composition in which various siloxane compounds are combined and compounded is proposed as an emulsion type silicon based coating agent (for example, refer to Reference 3). Besides, a coating agent in which chlorinated polyolefins having a maleic anhydride group, and spherical particles having elasticity are compounded to dehydrogenation condensation type silicone based emulsion is proposed to improve the adhesiveness and abrasion resistance of a coating film (for example, refer to Reference 4).

However, in the coating agent described in the Reference 3, there are problems in which the adhesiveness and the abrasion resistance of the coating film are not sufficient, and the coating film having sufficient adhesiveness and strength cannot be obtained relative to a solid-type rubber material and a material near thereto. Further, there are problems in which preservation stability of emulsion and a pot life (working life) after respective components are compounded is short.

The coating agent described in the Reference 4 is improved in coating uniformity, non-tackness, water repellancy, lubricity, adhesiveness with a base material, and so on. In addition, it is improved in prevention of occurrence of squeak caused by friction with a glass or the like under a state of being exposed to water, and prevention of a friction scratch to a metal paint surface. However, further improvement in abrasion resistance and environmental and safety improvements are required.

Further, a coating agent in which an amine-functional silicone emulsion and a polyurethane emulsion, and an epoxy resin or epoxy-functional silane are compounded is proposed as a coating agent having high abrasion resistance (for example, refer to Reference 5). Besides, a coating agent in which a silicone emulsion and a polyurethane emulsion are compounded with a predetermined ratio is also proposed (for example, refer to Reference 6).

However, there is a problem that the working life is short in the coating agent described in the Reference 5, and it is practically required to compound the organic solvent to obtain the sufficient working life. Besides, the abrasion resistance is not sufficient and the enough adhesiveness cannot be obtained for a base material composed of the EPDM and the TPO in the coating agent described in the Reference 6. Further, it is necessary to compound a super-high molecular weight polyethylene powder and ceramic beads to obtain performances such as low friction. In particular, it is very effective to improve the abrasion resistance to compound the super-high molecular weight polyethylene powder, but the powder in itself has a thermal softening point, and therefore, there is a problem in which characteristics thereof change largely depending on a thermosetting temperature and a heating time.

RELEVANT REFERENCES

Patent Reference

Reference 1: JP-A Hei 6-25604 (KOKAI)
Reference 2: JP-A Hei 8-225670 (KOKAI)
Reference 3: JP-A Hei 8-245882 (KOKAI)
Reference 4: JP-A 2005-506896 (KOKAI)
Reference 5: JP-B2 3869878 (PATENT)
Reference 6: JP-A 2009-520082 (KOKAI)

SUMMARY OF THE INVENTION

The present invention is made to solve the problems as stated above, and an object thereof is to provide a coating agent excellent in preservation stability, coating uniformity, non-tackness, water repellancy, working life, and lubricity, and in particular, in which adhesiveness and abrasion resistance relative to a base material are improved as a processing agent of a base material surface, particularly as a water-based coating agent for a molded body such as the EPDM and the TPO. Besides, another object of the present invention is to provide a coating agent in which a friction scratch to a metal paint surface is prevented, and further, squeak does not occur caused by a friction with a glass under a state it is exposed to water which have been emphasized in recent years.

The present inventors studied hard to attain the above-sated objects, and as a result, they found that a water-based coating agent having the above-stated characteristics can be obtained by compounding spherical particles having rubbery elasticity to an emulsion containing certain amino group-containing polyorganosiloxane, chlorinated polyolefin, and a water-dispersible polyurethane resin, to complete the present invention.

A coating composition of the present invention includes: (A) a water-based emulsion containing (a) amino group-containing polyorganosiloxane having self-crosslinking property, (b) chlorinated polyolefin, and (c) a water-dispersible polyurethane resin; (B) spherical particles made up of a rubbery elastic body mixed and dispersed in the water-based emulsion (A).

The coating composition of the present invention is excellent in preservation stability, coating uniformity, working life, and having wide curing conditions which are independent of a temperature and a time at a heat curing time, and according to the coating composition, it is possible to form a coating film excellent in adhesiveness with base materials composed of a rubber, a plastic, in particular with base materials composed of a foamed or non-foamed EPDM rubber and a TPO, having a smooth surface without projections and depressions, and roughness, good lubricity, non-tackness, water repellancy, and so on. Besides, in the coating film, a compound component does not bleedout from a surface thereof, a friction coefficient is low, and excellent in abrasion resistance. Further, a negative offect on a metal paint surface such as a friction scratch is improved, and squeak does not occur caused by the friction with a glass even if it is exposed to water.

MODE FOR IMPLEMENTING THE INVENTION

Hereinafter, embodiments of the present invention will be described. A coating composition according to the present embodiment is a water-based emulsion containing (a) amino group-containing polyorganosiloxane having self-crosslinking property, (b) chlorinated polyolefin, (c) a water-dispersible polyurethane resin, and (B) spherical particles composed of a rubbery elastic body. Hereinafter, each component is described in detail.

The amino group-containing polyorganosiloxane (a) for the present embodiment is the one having self-crosslinking property capable of crosslinking in itself, and a coating film having a gel property is formed when an emulsion containing the (a) component independently is coated and dried to be cured. Note that the coating film having the gel property means a coating film representing illiquidity. More specifically, a coating film which does not flow down even if a plate is set up vertically when a dried and cured film of which film thickness is approximately 10 μm is formed on an aluminum plate, is the coating film having the gel property.

The amino group-containing polyorganosiloxane (a) having self-crosslinking property and agelled coating film forming property is integrated together with the later-described (b) component and (c) component without bleeding out from the coating film obtained from the coating composition according to the embodiment, to form a flat-surface coating film having good non-tackness and water repellancy, without projections and depressions, and roughness. When the amino group-containing polyorganosiloxane (a) is compounded, it is preferable that an emulsion state one obtained by, for example, an emulsion polymerization and so on is compounded.

Non-water-soluble amine group-containing polyorganosiloxane is exemplified as the amine group-containing polyorganosiloxane being the (a) component represented by an average composition formula: $[R^1{}_a Si(OR^2)_b O_{(4-a-b)/2}]_n$ (in the formula, the $R^1$ represents a monovalent group selected from a hydrogen atom and a monovalent substituted or non-substituted hydrocarbon group, and at least one of all $R^1$s within one molecule is a monovalent hydrocarbon group having a substituted or non-substituted amino group coupled to a silicon atom via one or more carbon atom(s). The $R^2$ represents the hydrogen atom or a monovalent substituted or non-substituted hydrocarbon group. The "a" and "b" are numerals satisfying a relationship of $1 \leq a \leq 2.5$, $1 \leq a+b \leq 2.5$, $0 \leq b \leq 0.5$, and the "n" represents a numeral of 4 to 5000.). Note that the non-water soluble property represents a property which is not soluble in water, and specifically, it means that one weight part of the amino group-containing polyorganosiloxane is compounded relative to 100 weight parts of water at 25° C., but it is not solved and a uniform and transparent solution cannot be obtained.

An aminomethyl group, a β-aminoethyl group, a γ-aminopropyl group, a δ-aminobutyl group, a γ-(methylamino)propyl group, a γ-(ethylamino)propyl group, an N-(β-aminoethyl)-γ-aminopropyl group, an N-(β-dimethylaminoethyl)-γ-aminopropyl group, and so on can be exemplified as the monovalent hydrocarbon group having the substituted or non-substituted amino group coupled to the silicon atom via at least one carbon atom. Hydrogen atom; an alkyl group such as a methyl group, an ethyl group, a propyl group, a butyl group, a hexyl group; an alkenyl group such as a vinyl group, a propenyl group; an aryl group such as a phenyl group; an aralkyl group such as a phenethyl group; and the one in which a part of the hydrogen atom of these hydrocarbon groups is substituted by a halogen atom, a nitrille group, and so on are exemplified as the $R^1$ other than the above-stated amino group-containing hydrocarbon group. It is preferable to be the hydrogen atom, the methyl group, the vinyl group, and the phenyl group, and it is particularly preferable to be the methyl group among the above from points of view of easy to synthesis and easy to handle.

Hydrogen atom, a methyl group, an ethyl group, a propyl group, a butyl group, and so on are exemplified as the $R^2$. It is preferable to be the hydrogen atom, the methyl group, and the ethyl group from the points of view of easy to synthesis and easy to handle.

In the above-stated average composition formula, the "a" and "b" are the numerals satisfying the relationship of $1 \leq a \leq 2.5$, $0 \leq b \leq 0.5$, $1 \leq a+b \leq 2.5$. When the "a" and the "(a+b)" are less than one, or exceeds 2.5, the adhesiveness for the base material becomes insufficient. The "b" represents the number of hydroxyl groups or alkoxy groups coupled to the silicon atom, and it is good if the "b" is 0.5 or less, but the preservation stability of the coating agent is lowered when the "b" exceeds 0.5.

Besides, a polymerization degree "n" of the amino group-containing polyorganosiloxane represented by the average composition formula is within a range of 4 to 5000, and preferable to be within a range of 4 to 1000 from points of view of easy to synthesis, viscosity of a composition before cured is within a range which does not deteriorate workability, and the adhesiveness of a coating film after cured. When the polymerization degree is lower than four, the adhesiveness is not enough improved, and when the polymerization degree is higher than 5000, it is difficult to synthesize, and it becomes difficult to handle because the viscosity increases.

An amount of the amino group in the amino group-containing polyorganosiloxane is good as long as the amount in which the amino group-containing polyorganosiloxane independently represents the non-water-soluble property. An amino equivalent weight is set to be 100 (g/mol) to 15000 (g/mol), and preferable to be 150 (g/mol) to 1000 (g/mol). When the amino equivalent weight exceeds 15000 (g/mol) or less than 100 (g/mol), an effect to improve the adhesiveness becomes small.

A compound represented by a formula:

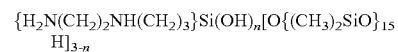

(in which n=1 or 2) can be cited as a preferable example of the amino group-containing polyorganosiloxane (a).

The chlorinated polyolefin (b) used for the present embodiment provides the coating film obtained from the coating composition according to the embodiment with the excellent adhesiveness and abrasion resistance for the rubber base material such as the EPDM. Besides, it is good in a stability after each component is compounded, and it enables the long working life.

It is preferable to compound the chlorinated polyolefin (b) in an emulsion mode. There is particularly no limitation in a chlorine content and a molecular weight of a chlorinated polyolefin and so on, but it is preferable to use an emulsion of modified chlorinated polypropylene having a maleic anhydride group as a reaction group from a point of view of ready availability.

A amount of the chlorinated polyolefin (b) is set to be 50 weight parts to 500 weight parts, and more preferable to be 100 weight parts to 250 weight parts relative to 100 weight parts of the amino group-containing polyorganosiloxane (a). Reasons for limiting the compound amount of the (b) component to the above-stated range is as follows: when the compound amount is less than 50 weight parts, it is impossible to fully attain the improvement of the adhesiveness with the rubber base material and the abrasion resistance, on the other hand, when the compound amount exceeds 500 weight parts, the other characteristics such as weather resistance is lowered because an effect of providing the adhesiveness with the rubber base material and the abrasion resistance is saturated. Note that the compound amount of the chlorinated polyolefin (b) and the compound amount of the amino group-containing polyorganosiloxane (a) represent amounts of active ingredients in the emulsions when they are compounded as the emulsions.

The water-dispersible polyurethane resin (c) used for the present embodiment provides water resistance and the abrasion resistance for the coating film obtained from the coating composition according to the embodiment. There is no particular limitation in an emulsification method of the water-dispersible polyurethane resin (c), a structure of a resin and so on, but a water dispersion of ionomer type polyurethane resin is preferable because it is possible to obtain a coating film excellent in water resistance.

The water dispersion of the ionomer type polyurethane resin can be obtained by publicly known methods. For example, (1) a method obtaining an ionomer resin by emulsifying an organic solvent solution or an organic solvent dispersion liquid of hydrophilic group-containing polyurethane resin obtained by reacting a hydrophilic group-containing compound, the other active hydrogen containing compounds, and polyisocyanate into water, (2) a method obtaining the ionomer resin by dispersing a hydrophilic group-containing terminal isocyanate group-containing urethane prepolymer obtained by reacting the hydrophilic group-containing compound, the other active hydrogen containing compounds, and polyisocyanate into water and reacting with polyamine, and so on can be cited.

Here, for example, a sulfonic acid containing compound such as 2-oxyethane sulfonic acid, sulfosuccinic acid, sulfanilic acid, 2,4-diaminotoluenesulfonic acid; a carboxylic acid containing compound such as 2,2-dimethylolpropionic acid, dioxymaleic acid, 3,4-diaminobenzoic acid; polyoxyethylene glycol and polyoxyethylene-polyoxypropylene copolymer glycol having at least one or more active hydrogens within a polymer, and so on can be cited as the hydrophilic group-containing compound. For example, a high molecular weight compound such as polyester polyol, polyether polyol; a polyoxy compound represented by glycerin, trimethylolpropane; a low molecular weight compound such as a diamine compound represented by ethylene diamine, piperazine, and so on can be cited as the other active hydrogen containing compounds.

For example, 2,4-tolylene diisocyanate, phenylenediisocyanate, 4,4-diphenylmethane diisocyanate, 1,6-hexamethylene diisocyanate, isophorone diisocyanate, and so on can be cited as polyisocyanate. A reaction of these can be performed under non-solvent condition, but it may be performed in organic solvent. The obtained resin is neutralized by a non-volatile base such as sodium hydroxide, potassium hydroxide; amines such as triethylamine, dimethylethanolamine; or ammonia and so on, and the ionomer resin is obtained by adding water. It is preferable to distill and remove the organic solvent from the ionomer type polyurethane resin obtained as stated above from a point of view of reducing a load to environment. Note that the water dispersion of the ionomer type polyurethane resin as stated above is preferable to be anionic ionomer type water dispersion in which a counter ion of an ion forming group is an ammonium ion ($NH_4^+$) to suppress a side reaction.

A compound amount of the water-dispersible polyurethane resin (ionomer type polyurethane resin water dispersion) (c) is set to be 10 weight parts to 500 weight parts, more preferable to be 50 weight parts to 300 weight parts relative to 100 weight parts of the amine group-containing polyorganosiloxane (a) as an active ingredient amount. The reason why the compound amount of the (c) component is limited to the above-stated range is because when the compound amount is less than 10 weight parts, an effect of providing the water resistance and the abrasion resistance for the rubber base material cannot be fully attained, on the other hand, when it is compounded more than 500 weight parts, flexibility of a coating film is lost, whitening and cracks are generated, and the other characteristics such as the water repellancy, non-tackness of a surface of the coating film are lowered.

The coating composition according to the present embodiment is constituted by compounding spherical particles composed of the rubbery elastic body (B) to the water-based emulsion (A) containing the above-stated respective component of (a) to (c).

The spherical particles of the rubber elastic body (B) used for the embodiment decreases a friction coefficient of the coating film obtained from the coating composition, and provides the good lubricity. Besides, it provides the good abrasion resistance for the coating film, and required characteristics such that the squeak does not occur when the glass is rubbed under the state in which the molded body to which the coating is performed is exposed to water, and a painted surface is not scratched by the friction with the metal paint surface are also satisfied.

There is no particular limitation in kinds of the rubbery elastic body constituting the spherical particles, but it is preferable to use an elastic material in which a value of hardness (rubber strength) measured by JIS K 6253 Durometer type A is less than 90 degrees, more preferable to be within a range of 60 degrees to 80 degrees. When particles of hard or semi-hard material of which hardness is 90 degrees or more is used, the effects such as the suppression of the squeak under the state exposed to water and the prevention of scratch of the metal paint surface cannot be fully obtained.

It is preferable to use particles composed of thermosetting polymers such as crosslinked polyurethane base, crosslinked polymethylmethacrylate base, crosslinked polyacrylic acid ester base, crosslinked polybutylmethacrylate base, polyamide base as the spherical particles of the rubbery elastic body (B) from points of view of ready availability and easy to compound. An average particle size of the particles is preferable to be 0.1 μm to 100 μm, and more preferable to be 1 μm to 20 μm. When the average particle size is less than 0.1 μm, the lubricity of the coating film becomes worse, on the other hand, when the average particle size exceeds 100 μm, the abrasion resistance becomes worse, and therefore, it is not preferable.

A compound amount of the spherical particles of the rubbery elastic body (B) is set to be 20 weight parts to 300 weight parts, more preferable to be 50 weight parts to 200 weight parts relative to 100 weight parts of the amino group-containing polyorganosiloxane (a). The compound amount of the (B) component is limited to the above-stated range because when the compound amount is less than 20 weight parts, the lubricity of the coating film deteriorates, on the other hand, when it exceeds 300 weight parts, the paintability deteriorates and the flexibility held by the coating film is lost. Besides, when the compound amount of the (B) component exceeds 300 weight parts, it is not preferable because the abrasion resistance also deteriorates.

When the (B) spherical particles of the rubbery elastic body are compounded, it is preferable to compound the one which is mixed and dispersed into water. Note that when the (B) spherical particles of the rubbery elastic body are difficult to be uniformly dispersed in water, it is preferable to let it disperse by using a dispersion agent such as a surface active agent according to need. The coating composition according to the present embodiment can be obtained by mixing the respective components of (a) to (c) and the dispersion liquid of the spherical particles of the rubbery elastic body (B). A mixing order of the respective components of (a) to (c) and the water dispersion liquid of the spherical particles of the rubbery elastic body (B) is not particularly limited.

The following respective components may be further compounded to the coating composition according to the present embodiment. An inorganic or organic ultraviolet absorbent to improve the weather resistance property, an inorganic filler such as a silica powder of which average particle size is approximately 0.01 μm to 50 μm or an organic filler such as polyolefin (for example, polyethylene) and a polycarbonate resin to improve a mat property, an inorganic pigment and so on for coloring, epoxy-based, melanine-based, imide-based, amine-based and isocyanate-based crosslinking agents to improve the abrasion resistance can be added within a range of a purpose of the invention. Further, a leveling agent, the dispersion agent, a thickener, a defoamer, an antiseptic agent are arbitrary compounded appropriately according to need.

When the coating composition of the present invention is coated, it is coated on a surface of a base material made up of a paper, a rubber, a plastic, a metal, and so on by means of methods such as a dip coating, a spray coating, a brush application, a knife coating, a roll coating. Next, it is left at a room temperature for several hours, or it is appropriately heated in accordance with a degree of heat resistance of the base material to cure the coating film. Heating conditions are preferable to be as follows: a temperature of 120° C. to 180° C. for 10 seconds to 30 seconds when the base material is the paper, a temperature of 80° C. to 180° C. for one minute to five minutes when the base material is the rubber, and a temperature of 70° C. to 150° C. for 30 seconds to two minutes when the base material is the plastic.

According to the coating composition of the present embodiment, a cured coating film excellent in the coating uniformity, excellent in the adhesiveness, the abrasion resistance for the base material compared to a process method according to a conventional silicon composition is formed when the surfaces of various base materials are processed. In particular, it is possible to form a cured coating film having excellent coating film properties such as a tactile impression, a lubricious feeling peculiar to silicon relative to the rubber, the plastic base material, and in particular, to a base material composed of a foamed EPDM rubber and the TPO in which the sufficient adhesiveness cannot be obtained by the conventional non-adhesive coating film, and the cured coating film having the excellent adhesiveness, abrasion resistance which do not exist in the conventional coating film.

Besides, the coating composition according to the present embodiment forms the cured coating film from the room temperature to a relatively low temperature, and therefore, it is possible to process for a base material in which the heat resistance is low and a base material which is large and difficult to perform the heating process, and the cured coating film in which the non-tackness for the other substance is good, having the water repellancy, and good abrasion resistance is formed. Further, it is excellent in the preservation stability, the stability after each component is compounded, and the working life thereof is long. Besides, the organic solvent and the organic metallic catalyst are not used, and the dehydrogenation condensation reaction does not occur to form the cured coating film, and therefore, it is excellent in environment and safety.

Accordingly, the coating composition according to the present embodiment can be suitably used for a usage to which the EPDM rubber and so on are used, for example, as a finishing agent of rubber parts such as a weather strip for a vehicle, a printer blade, a rubber for vibration insulation, and a building material gasket.

Hereinafter, the present invention is concretely described by citing examples, but the present invention is not limited to the following examples. Note that a "part" represents a "weight part", and "%" represents "weight %" in the example respectively. Besides, all of the physical property values such as viscosity represent measurement values at 25° C. and at a relative humidity 50%.

EXAMPLES 1 TO 5, COMPARATIVE EXAMPLES 1 TO 6

Respective components represented in Table 1 were compounded with compositions represented in the same table, they were uniformly stirred and mixed as stated below to obtain coating compositions. At first, particle components (the elastic spherical particles-1, the elastic spherical particles-2, or the inelastic spherical particles) were mixed with water and uniformly dispersed, and thereafter, the water dispersion liquids were each added to an emulsion obtained by mixing an amino group-containing silicone emulsion, a chlorinated polyolefin emulsion, and the polyurethane resin water dispersion, and they are uniformly stirred and mixed. In an example 5, an epoxy-based crosslinking agent was further added and mixed. Besides, in a comparative example 6, polydimethylsiloxane emulsion, methylhydrogensiloxane emulsion, and dibutyltin dilaurate were further added and mixed thereto.

In Table 1, the amino group-containing emulsion-1 was an emulsion-polymerized emulsion containing the amino group-containing polydimethylsiloxane having a gelled coating film forming property represented by a formula:

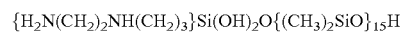

for a ratio of 30%, the amino group-containing silicone emulsion-2 was a mechanical emulsified emulsion containing the amino group-containing polydimethylsiloxane represented by a formula:

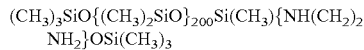

for a ratio of 30%.

The chlorinated polyolefin emulsion-1 was an emulsion containing maleic anhydride modified chlorinated polypropylene (in which maleic anhydride content was 1.7%, chlorine content was 17%, molecular weight was approximately 60000) for 30%, and the chlorinated polyolefin emulsion-2 was an emulsion containing the maleic anhydride modified chlorinated polypropylene (in which maleic anhydride content was 1.4%, chlorine content was 15 weight %, molecular weight was approximately 100000) for 30%.

The polyurethane resin water dispersion-1 was a water dispersion containing the ionomer type polyurethane resin having polyester skeleton for 20%, and the polyurethane resin water dispersion-2 was a water dispersion containing the ionomer type polyurethane resin having polyether skeleton for 30%.

The elastic spherical particles-1 were crosslinked polyurethane soft powder (average particle size was 8 μm) in which the hardness measured by the JIS K6253 Durometer type A (hereinafter, represented as just JIS hardness) was 74, and the elastic spherical particles-2 were crosslinked polyacrylic acid ester powder (average particle size was 15 μm) in which the JIS hardness was 78. The inelastic spherical particles were polymethylsilsesquioxane powder (average particle size was 6 μm) in which the above-stated JIS hardness was 90 or more.

The epoxy-based crosslinking agent was polyhydroxyalkane polyglycidyl ether (viscosity is 5000 mPa·s).

The polydimethylsiloxane emulsion was an emulsion-polymerized emulsion containing terminal hydroxyl group-blocked polydimethylsiloxane in which the viscosity was 1400000 mPa·s for a ratio of 50%, and methylhydrogensiloxane emulsion was an mechanical emulsified emulsion containing polymethylhydrogensiloxane represented by an average formula;

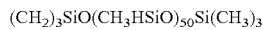

for a ratio of 30%.

Next, the coating compositions obtained by the examples 1 to 5, the comparative examples 1 to 6 were each coated on a surface of a sheet composed of the foamed EPDM rubber and the TPO by using a spray gun so that a film thickness of the cured coating film became 10 μm. After that, the water was vaporized from the coating film, and thereafter, it was heated to be dried in an oven at 180° C. for two minutes to form a cured coating film.

Subsequently, the adhesiveness of the cured coating film relative to the base material was examined by using the following methods as for each of the foamed EPDM rubber sheets and the TPO sheets which were surface processed. Besides, the water repellancy, the water resistance, the friction coefficient, the abrasion resistance, and the squeak were each examined by methods described below as for the cured coating film formed on the foamed EPDM rubber sheet. Further, the presence/absence of the bleedout from the coating film surface, the working life of the coating composition were also examined. Results are represented in Table 1.

[Adhesiveness]

Eleven pieces of parallel lines were cut vertically and horizontally with intervals of 1 mm at the coating film surface to crosscut 100 grids, an adhesive tape was adhered thereon, and thereafter, the adhesive tape was peeled off, to measure the number of grids which were not peeled. Note that the one in which a silicone adhesive YR3340 (manufactured by Momentive Performance Material Japan LLC) was coated on a polyester film to be a thickness of 40 μm, and thereafter, it was left in a constant temperature high humidity room for 48 hours was used as the adhesive tape.

[Water Repellancy]

A contact angle of a water droplet at the surface of the cured coating film was measured by using a contact angle measuring instrument. The one in which the contact angle represented 100° or more was judged to be good in the water repallancy, and the one in which the contact angle represented less than 100° was judged to be no good in the water repellancy.

[Water Resistance]

The surface-processed foamed EPDM rubber sheet was immersed in hot water at 70° C. for seven days, then it was pulled out, and an external appearance of the cured coating film after dried was visually observed. The one in which there was no change in the external appearance of the coating film before and after the water resistance test was judged to be good, and the one in which changed such as whitening and peeling were seen on the coating film was judged to be no good.

[Friction Coefficient]

A glass plate with a width of 10 mm and a length of 100 mm was placed on the surface of the cured coating film, then the glass plate was moved along the cured coating film at a speed of 900 mm/min while applying a load of 200 g, and a coefficient of dynamic friction was found from a tensile stress obtained at that time. Note that a safety system worked when a maximum coefficient of static friction being a value when the glass plate started moving exceeds 2.0, and the measurement became impossible.

[Abrasion Resistance]

A clock meter type abrasion test was performed by JIS K 6404-16, and the number of frictions was measured when the cured coating film was peeled.

[Squeak]

Water of 0.5 mL was uniformly diffused on the glass plate with the width of 100 mm and the length of 100 mm, and a sound generated when the coating film surface was rubbed against the glass plate was examined. The one in which the sound was not generated was judged to be good.

[Presence/Absence of Bleedout]

The coating film surface was pressed to a painted panel at 25° C. for 24 hours, and the presence/absence of transition of a bleedout substance to a surface of the painted panel was visually examined. It was judged that the bleedout was present when the transition was identified, and the bleedout was absent when the transition was not identified.

[Working Life]

After the coating composition was prepared, the time until a gel was generated in the liquid was examined by leaving it at a room temperature (25° C.).

TABLE 1

| | | EXAMPLE | | | | | COMPARATIVE EXAMPLE |
|---|---|---|---|---|---|---|---|
| | | 1 | 2 | 3 | 4 | 5 | 1 |
| COMPOSITION (parts) | AMINO GROUP-CONTAINING SILICONE EMULSION-1 | 15 | 15 | 15 | 15 | 15 | |
| | AMINO GROUP-CONTAINING SILICONE EMULSION-2 | | | | | | |
| | CHLORINATED POLYOLEFIN EMULSION-1 | 40 | | 40 | 40 | 40 | 40 |
| | CHLORINATED POLYOLEFIN EMULSION-2 | | 40 | | | | |
| | POLYURETHANE RESIN WATER DISPERSION-1 | 20 | 20 | | 20 | 20 | 20 |
| | POLYURETHANE RESIN WATER DISPERSION-2 | | | 15 | | | |
| | ELASTIC SPHERICAL PARTICLES-1 | 5 | 5 | 5 | | 5 | 5 |
| | ELASTIC SPHERICAL PARTICLES-2 | | | | 5 | | |
| | INELASTIC SPHERICAL PARTICLES | | | | | | |
| | EPOXY-BASED CROSSLINKING AGENT | | | | | 1 | |
| | POLYDIMETHYLSILOXANE EMULSION | | | | | | |
| | METHYLHYDROGENSILOXANE EMULSION | | | | | | |
| | DIBUTYLTIN DILAURATE | | | | | | |
| | WATER | 20 | 20 | 25 | 20 | 20 | 20 |
| Physical Property | ADHESIVENESS (EPDM) | 100/100 | 100/100 | 100/100 | 100/100 | 100/100 | 100/100 |
| | ADHESIVENESS (TPO) | 100/100 | 100/100 | 100/100 | 100/100 | 100/100 | 100/100 |
| | WATER REPELLANCY | GOOD | GOOD | GOOD | GOOD | GOOD | NO GOOD |
| | WATER RESISTANCE | GOOD | GOOD | GOOD | GOOD | GOOD | NO GOOD |
| | BLEEDOUT FROM COATING FILM SURFACE | Absent | Absent | Absent | Absent | Absent | Absent |
| | FRICTION COEFFICIENT | 0.30 | 0.35 | 0.32 | 0.25 | 0.25 | Unable to measure |
| | ABRASION RESISTANCE (NUMBER OF ABRASION) | 30000 | 30000 | 20000 | 25000 | 40000 | 1000 |
| | SQUEAK | GOOD | GOOD | GOOD | GOOD | GOOD | SQUEAK IS GENERATED |
| | WORKING LIFE (h; HOUR) | 72 h or more | 72 h or more | 72 h or more | 72 h or more | 24 h | 72 h or more |

| | | COMPARATIVE EXAMPLE | | | | |
|---|---|---|---|---|---|---|
| | | 2 | 3 | 4 | 5 | 6 |
| COMPOSITION (parts) | AMINO GROUP-CONTAINING SILICONE EMULSION-1 | | 15 | 15 | 15 | 15 |
| | AMINO GROUP-CONTAINING SILICONE EMULSION-2 | 15 | | | | |
| | CHLORINATED POLYOLEFIN EMULSION-1 | 40 | | 40 | 40 | 40 |
| | CHLORINATED POLYOLEFIN EMULSION-2 | | | | | |
| | POLYURETHANE RESIN WATER DISPERSION-1 | 20 | 20 | | 20 | |
| | POLYURETHANE RESIN WATER DISPERSION-2 | | | | | |
| | ELASTIC SPHERICAL PARTICLES-1 | 5 | 5 | 5 | | 5 |
| | ELASTIC SPHERICAL PARTICLES-2 | | | | | |
| | INELASTIC SPHERICAL PARTICLES | | | | 5 | |
| | EPOXY-BASED CROSSLINKING AGENT | | | | | |
| | POLYDIMETHYLSILOXANE EMULSION | | | | | 30 |
| | METHYLHYDROGENSILOXANE EMULSION | | | | | 2 |
| | DIBUTYLTIN DILAURATE | | | | | 1 |
| | WATER | 20 | 20 | 20 | 20 | 40 |
| Physical Property | ADHESIVENESS (EPDM) | 100/100 | 50/100 | 100/100 | 100/100 | 100/100 |
| | ADHESIVENESS (TPO) | 100/100 | 0/100 | 100/100 | 100/100 | 0/100 |
| | WATER REPELLANCY | GOOD | GOOD | GOOD | GOOD | GOOD |
| | WATER RESISTANCE | GOOD | NO GOOD | NO GOOD | GOOD | GOOD |

TABLE 1-continued

| | | | | | |
|---|---|---|---|---|---|
| BLEEDOUT FROM COATING FILM SURFACE | Present | Absent | Absent | Absent | Absent |
| FRICTION COEFFICIENT | 0.20 | 0.25 | 0.35 | 0.10 | 0.30 |
| ABRASION RESISTANCE (NUMBER OF ABRASION) | 10000 | 1000 | 5000 | 3000 | 500 |
| SQUEAK | GOOD | GOOD | GOOD | SQUEAK IS GENERATED | GOOD |
| WORKING LIFE (h; HOUR) | 72 h or more | 8 h | 72 h or more | 72 h or more | 72 h or more |

As it can be seen from Table 1, the coating compositions obtained by the examples 1 to 5 each have the long working life and wide curing conditions compared to the compositions obtained by the comparative examples 1 to 6. According to the coating compositions, it is possible to form the coating film extremely excellent in the adhesiveness relative to the base material composed of the EPDM rubber and the TPO, and having good lubricity, water repellancy, water resistance. Besides, the coating film does not have the bleedout, the friction coefficient is low, the abrasion resistance is good, and the squeak is not generated caused by the friction with the glass even when it is exposed to water.

As described hereinabove, according to the coating composition of the present invention, it is possible to form the cured coating film excellent in the adhesiveness relative to the base material composed of the rubber, the plastic, in particular to the base material composed of the foamed or non-foamed EPDM rubber and the TPO and having good lubricity, non-tackness, water repellancy, and so on. Besides, the coating film has the low friction coefficient, and good abrasion resistance.

Accordingly, the coating composition of the present invention is able to be suitably used as a finishing agent of rubber parts such as the weather strip for the vehicle, the printer blade, the rubber for vibration insulation, the building material gasket, and so on.

What is claimed is:

1. A coating composition, comprising:
(A) a water-based emulsion containing (a) amino group-containing polyorganosiloxane having self-crosslinking property, (b) chlorinated polyolefin, and (c) a water-dispersible polyurethane resin; and
(B) spherical particles made up of a rubbery elastic body mixed and dispersed in the water-based emulsion (A),
wherein
the amino group-containing polyorganosiloxane (a) is represented by a formula:

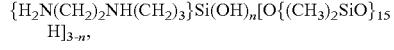

in which n=1 or 2, and
(A) the water-based emulsion contains no curing catalyst.

2. The coating composition according to claim 1,
wherein the water-based emulsion (A) is made up by mixing a first emulsion containing the amino group-containing polyorganosiloxane (a), a second emulsion containing the chlorinated polyolefin (b), and a water dispersion of the polyurethane resin (c).

3. The coating composition according to claim 1,
wherein the water-dispersible polyurethane resin (c) is a water dispersion containing an ionomer polyurethane resin.

4. The coating composition according to claim 3,
wherein the water dispersion containing the ionomer polyurethane resin is a water dispersion of an anionic ionomer polyurethane resin in which a counter ion of an ion forming group is an ammonium ion ($NH_4^+$).

5. The coating composition according to claim 1,
wherein the spherical particles (B) are made up of a rubbery elastic body in which a hardness based on JIS K 6253 is less than 90 degrees.

6. The coating composition according to claim 1,
wherein the spherical particles (B) are made up of at least one selected from each of a crosslinked polyurethane based polymer, a crosslinked polymethylmethacrylate based polymer, a crosslinked polyacrylic acid ester based polymer, a crosslinked polybutylmethacrylate based polymer, and a polyamide based polymer.

7. The coating composition according to claim 1,
wherein the chlorinated polyolefin (b) for 50 weight parts to 500 weight parts, the water-dispersible polyurethane resin (c) for 10 weight parts to 500 weight parts, and the spherical particles of the rubbery elastic body (B) for 20 weight parts to 300 weight parts are each contained relative to 100 weight parts of the amino group-containing polyorganosiloxane (a).

8. The coating composition according to claim 1,
wherein a coating film of the coating composition is formed by being coated on a molded body made up of a foamed or non-foamed ethylene-propylene-diene ternary copolymer, or a thermoplastic olefinic elastomer.

9. The coating composition according to claim 2,
wherein the water-dispersible polyurethane resin (c) is a water dispersion containing an ionomer polyurethane resin.

10. The coating composition according to claim 2,
wherein the spherical particles (B) are made up of a rubbery elastic body in which a hardness based on JIS K 6253 is less than 90 degrees.

11. The coating composition according to claim 3,
wherein the spherical particles (B) are made up of a rubbery elastic body in which a hardness based on JIS K 6253 is less than 90 degrees.

12. The coating composition according to claim 4,
wherein the spherical particles (B) are made up of a rubbery elastic body in which a hardness based on JIS K 6253 is less than 90 degrees.

13. The coating composition according to claim 2,
wherein the spherical particles (B) are made up of at least one selected from each of a crosslinked polyurethane based polymer, a crosslinked polymethylmethacrylate based polymer, a crosslinked polyacrylic acid ester based polymer, a crosslinked polybutylmethacrylate based polymer, and a polyamide based polymer.

14. The coating composition according to claim 2,
wherein the chlorinated polyolefin (b) for 50 weight parts to 500 weight parts, the water-dispersible polyurethane resin (c) for 10 weight parts to 500 weight parts, and the spherical particles of the rubbery elastic body (B) for 20 weight parts to 300 weight parts are each contained relative to 100 weight parts of the amino group-containing polyorganosiloxane (a).

* * * * *